United States Patent
Klaiber et al.

(10) Patent No.: US 7,861,852 B2
(45) Date of Patent: Jan. 4, 2011

(54) DEVICE FOR CONVEYING OBJECTS

(75) Inventors: Franz Klaiber, Wehingen (DE); Peter Novak, Tagerwilen (CH)

(73) Assignee: Sidel Participations, S.A.S., Octeville-sur-Mer (FR)

( * ) Notice: Subject to any disclaimer, the term of this patent is extended or adjusted under 35 U.S.C. 154(b) by 0 days.

(21) Appl. No.: 11/991,581

(22) PCT Filed: Sep. 8, 2006

(86) PCT No.: PCT/EP2006/008772

§ 371 (c)(1),
(2), (4) Date: Mar. 19, 2009

(87) PCT Pub. No.: WO2007/028627

PCT Pub. Date: Mar. 15, 2007

(65) Prior Publication Data

US 2009/0211880 A1 Aug. 27, 2009

(30) Foreign Application Priority Data

Sep. 9, 2005 (DE) .................. 10 2005 043 282
Aug. 15, 2006 (DE) .................. 10 2006 038 320

(51) Int. Cl.
*B65G 15/14* (2006.01)
(52) U.S. Cl. ............... 198/626.1; 198/626.6; 198/817
(58) Field of Classification Search .......... 198/604, 198/606, 626.4, 626.6, 817, 860.1, 861.1, 198/626.1

See application file for complete search history.

(56) References Cited

U.S. PATENT DOCUMENTS

| | | | | |
|---|---|---|---|---|
| 3,951,257 A | * | 4/1976 | Storace et al. | 198/626.6 |
| 4,802,571 A | * | 2/1989 | Born et al. | 198/626.1 |
| 5,029,696 A | * | 7/1991 | Van Tilburg | 198/626.1 |
| 5,145,055 A | * | 9/1992 | Kondo | 198/803.9 |
| 5,875,800 A | | 3/1999 | Johnson | |
| 5,950,804 A | * | 9/1999 | Farkas | 198/626.1 |
| 6,109,426 A | * | 8/2000 | Messer, III | 198/817 |
| 6,131,724 A | * | 10/2000 | Hirasawatu et al. | 198/681 |
| 6,382,399 B2 | * | 5/2002 | Simkowski | 198/626.1 |
| 6,514,015 B1 | | 2/2003 | Trendel | |
| 6,786,326 B2 | * | 9/2004 | Hiramoto et al. | 198/817 |

FOREIGN PATENT DOCUMENTS

| | | |
|---|---|---|
| DE | 35 15 353 | 10/1986 |
| DE | 210 10 929 | 11/2002 |
| EP | 0 842 875 | 5/1998 |
| JP | 11 001212 | 1/1999 |
| WO | WO 97/10163 | 3/1997 |
| WO | WO 01/85580 | 11/2001 |

* cited by examiner

*Primary Examiner*—James R Bidwell
(74) *Attorney, Agent, or Firm*—Lambert & Associates; Adam J. Bruno; Gary E. Lambert

(57) ABSTRACT

Disclosed is a device for conveying pro-filled objects, particularly bottles or parisons comprising an annular collar between two sliding planes with the aid of at least one conveying apparatus, at least one part of which rests against the object in a frictionally engaging manner and is supported on receiving elements or pressure rollers. The part of the conveying apparatus that rests against the object in a frictionally engaging manner is resilient or is mounted in a resilient fashion.

18 Claims, 11 Drawing Sheets

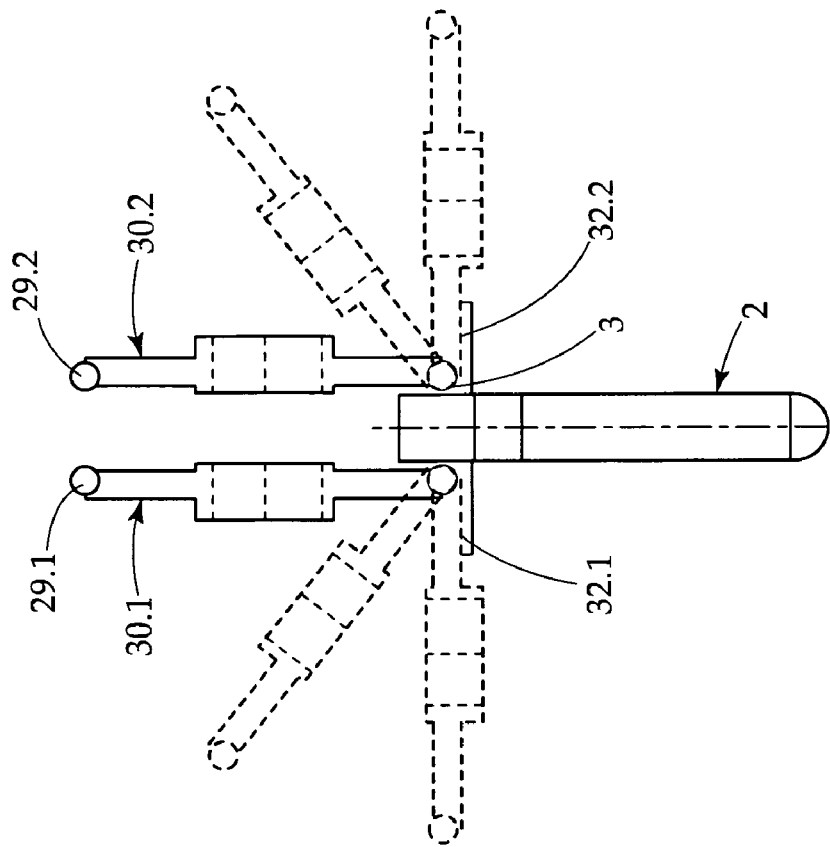
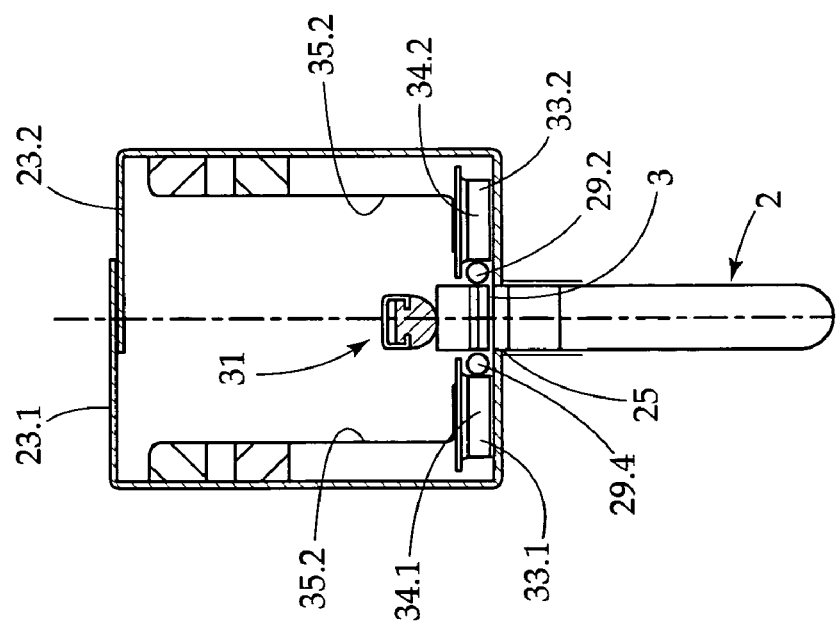
FIG. 9
FIG. 8

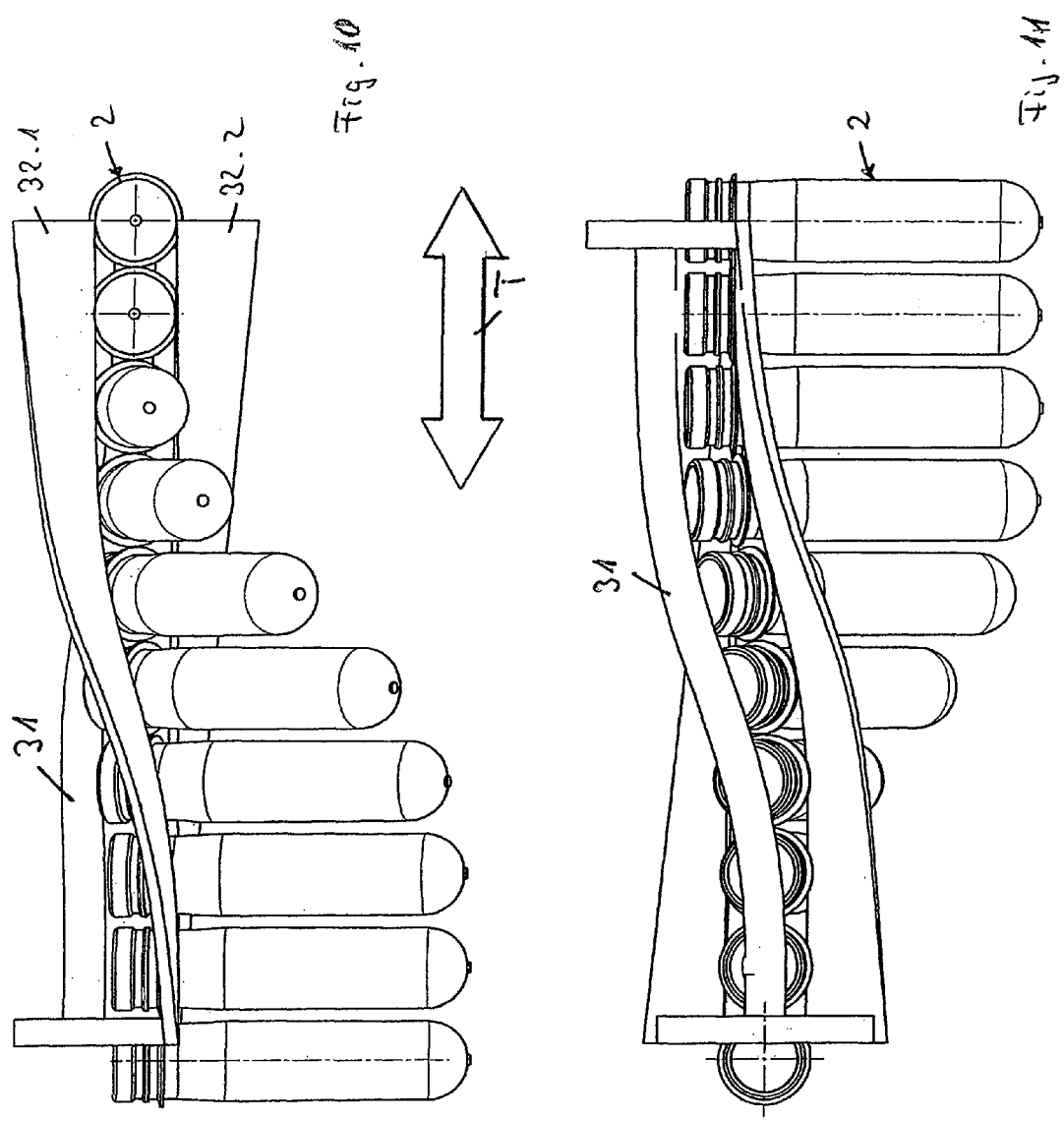

DEVICE FOR CONVEYING OBJECTS

CROSS REFERENCE TO RELATED APPLICATION

This application is for entry into the U.S. National Phase under §371 for International Application No. PCT/EP2006/008772 having an international filing date of Sep. 8, 2006, and from which priority is claimed under all applicable sections of Title 35 of the United States Code including, but not limited to, Sections 120, 363 and 365(c), and which in turn claims priority under 35 USC 119 to German Patent Application No. 10 2005 043 282.4 filed on Sep. 9, 2005 and German Patent Application No. 10 2006 038 320.6 filed on Aug. 15, 2006.

BACKGROUND OF THE INVENTION

The invention concerns a device for transport of objects with a profiling, especially bottles or preforms with an annular collar, between two sliding planes or support devices by means of at least one transport device, at least part of which lies frictionally against the object and is supported against mounting elements or pressure rolls.

DESCRIPTION OF THE RELATED ART

A number of objects must now be transported from one processing station to the next or to packaging. This is particularly true for bottles, which are filled or labeled during transport. However, this is especially true for preforms, which are produced in an injection molding machine and then blown up to a bottle in a blow molding machine. The preforms have an annular collar which serves essentially for handling of the preforms and later bottles. The annular collar is provided just beneath the bottle opening and generally also limits the thread for attachment, of a screw cap.

Hinge chains, flat belts, circular profile cords or the like are known for transport of bottles from DE 35 15 353 A1, which engage beneath the annular collar and thus produce transport.

The annular collar in EP 0 842 875 A1 is engaged at the top and bottom by a pair of endless cords.

According to the present technique the preforms produced in the injection molding die are arranged in complicated installations that require considerable space and transported to the blow molding machine. It is new to separate these preforms in a centrifuge-like separator, as is described, for example, in PCT/EP2006/050682.

SUMMARY OF THE INVENTION

The task of the present invention is to provide an appropriate device of the aforementioned type with which the objects, especially preforms can be arranged and reliably transported from one to the next station.

The fact that the part of the transport device lying frictionally against the object is flexible or mounted flexibly leads to the solution to the task.

The most important advantage of this flexible mounting of the objects is that both the possibility of transport and holdup exists. This is of great importance for practical application of the device. The possibility of producing a dynamic pressure also exists.

The containers that are transported preferably have a body, an annular collar and an opening and they are preferably PET bottles and PET preforms. Support devices and transport devices are provided to support the transport containers, the support devices being arranged fixed. The support devices can be formed from plastic or metal strips. The support devices, however, cannot only be designed as a strip, but any configuration is instead possible, like a band with a circular cross section.

The at least one transport device is preferably capable of main power introduction into the container for forward movement in the transport direction. The support device and the transport device preferably engage beneath or above the annular collar. Engagement of the support device or transport device touching the annular collar is just as conceivable as engagement carried out with a slight spacing to the annular collar.

The at least one transport device is preferably designed as a revolving strand side on which spring elements are mounted. By cooperation of the spring elements with a support device or with spring elements of other transport devices, clamping of the containers in the area of the annular collar is obtained.

According a preferred modification of the invention, the support devices are mounted fixed and the transport device movable in the transport direction, two support devices and two support devices also preferably being present. The containers are preferably transported suspended so that the support devices engage parallel tangentially beneath the annular collar, whereas the two transport devices are mounted tangentially parallel above the annular collar. However, it is also within the scope of the invention for three support devices to be present which hold the container in a certain position, whereas a transport device ensures forward movement in the transport direction.

It is also possible to provide a total of only three support and transport devices. In this case either two support devices and one transport device or two transport devices and one support device can be provided. With four engagement possibilities available above and below the annular collar in the preform to its left and right, one engagement site remains free during use of three support devices or transport devices in which it is completely irrelevant whether the free site is on the left, right, top or bottom.

According to a particularly preferred modification of the invention, part of the transport device is designed as an endlessly revolving chain, the chain consisting at least of a chain strand, mounting elements and spring elements. Return of the chain preferably occurs parallel to the plane of the annular collar. The chain has mounting elements at regular intervals to which spring elements can be fastened. The spring elements can then be designed so that one spring element per mounting element or several mounting elements per spring element are necessary. The mounting elements are preferably rolls with grooves made in them in which the spring elements can be guided. The spring elements are therefore preferably made from wire, which is guided or secured in the grooves of the mounting elements. The mounting elements, however, can also be pins or other spring fastening possibilities. In addition, it is conceivable that the spring, elements are fastened directly to the revolving chain. Two mounting elements are preferably used to fasten one spring element, in which the spacings of the mounting element that accommodate the spring elements can be greater, smaller or equal to the spacings of the next mounting elements.

In the variant in the which the spring element is made from wire and is fastened to two mounting element, a preferred fastening appears so that the beginning and end of the wire are situated on a mounting element, whereas the other mounting element is wrapped around by the wire, preferably one and a half times. The one mounting element is preferably enclosed by the wire so that it forms a C shape, the spacing of the arms in the C shape being greater than the diameter of a mounting element. In this way it is possible for the spring element to move relative to the mounting element in order to be able to clamp the container.

According to a preferred modification of the invention two transport devices designed as endlessly revolving chains are situated to the left and right parallel to the transport direction, which clamp the containers above the annular collar. In this arrangement the chain strands with their mounting elements and spring elements are arranged in mirror fashion on the plane passing through the center point of the containers transported in a row in a transport device. The mirror arrangement has the advantage that the spring elements can optimally grasp the containers. In their unclamping state two opposite C-shaped areas of the spring elements are spaced from each other so that the annular collar diameter is greater than the spacing of these two spring element areas. This has the advantage that optimal clamping of the containers can be achieved. If the containers are clamped between two C-shaped areas of the spring elements, the arms of the C-shaped elements in contact with the containers on the annular collars move in the direction of the center point of the mounting elements. Owing to the fact that the spring elements enclose a mounting element, another type of fastening is not necessary.

During transport of the containers through the device, the annular collar is situated in an annular collar plane that preferably is perpendicular to the plane through the center point of the containers transported in a row. According to a preferred modification of the invention the spring elements and the support devices are arranged so that they are parallel to the plane of the annular collar. An angled arrangement of the support devices and/or transport devices, however, is also conceivable so that an arrangement of the spring element with reference to the annular collar plane at an angle between 0 and 90 degrees is conceivable.

In order to optimally guide the chain to which the mounting elements and spring elements are fastened, according to a preferred modification of the invention guides are provided in which the chain strands can run. Exact guiding of the revolving transport devices has the advantage that the mounting elements and the spring elements are also exactly guided, which again means that the holding force between two spring elements can be exactly defined. The spring elements are preferably designed so that they can be adjusted so that the holding force with which the containers can be grasped on the annular collar is adjustable. The spring force is best adjusted so that the spring elements continue to move at the occurring dynamic pressure of the containers and therefore "slip through" the containers.

The guides preferably have grooves in which the chain strand can be guided. The guides are preferably situated parallel to the transport direction.

In another practical example of the invention at least one part of the transport device that lies frictionally against the object is supported against pressure rolls and these pressure rolls are mounted flexibly. Because of this reliable transport of the preforms is guaranteed. In one practical example of the invention the pressure rolls are mounted on spring tabs, leaf springs, spring brackets or the like, which are biased. In another variant of the invention the pressure rolls can be arranged on a support block which is supported against a wall via a spring. In order for this springs not to break off laterally, it preferably wraps around a pin through which the support block is inserted into the wall.

In a practical example of the invention endless belts, preferably endless round belts can be allocated to the object being transported on both sides, between which the object being transported is unclamped. By the choice of endless belts with round cross section, no change in engagement points on the objects occurs, regardless of the position in which the preforms are transported.

These endless belts wrap around deflection rolls arranged at a spacing, which are preferably tiltable so that by changing the position of the deflection rolls the preforms can be transported not only suspended, but also horizontally or event vertically upright, depending on the desire. A hold-down against which the preforms stop or lie is an additional aid here. This means the preforms can be transported in any position and untimed, which was not possible in the devices known thus far. For example, no transport and back pressure generation from the bottom up of the preforms was thus far possible. This is feasible with the device according to the invention.

The sliding planes and support devices naturally must be adapted to the desired transport path. In this way any type of guiding of the preforms is possible. This means that the spatial alignment of the preforms can be adjusted to an inlet on a blow molding machine of different manufacturers.

Especially during transport of preforms, but also bottles, there is a necessity that the transport path extend in one plane. If the transport path, however, is rising or falling and passes through different slopes, there are positive and negative slope areas in which the spacing of the center axes of the consecutive objects is reduced or widened. If the spacing is reduced, the consecutive objects deflect, require more space and can jam. They also rub against each other.

To prevent this drawback, according to the present invention in one practical example, the possibility is offered that a deflection element is inserted in the area of the negative slope in the transport path of the object so that they slide along a sliding surface and are deflected outward. Because of this the diminishing spacing between the said axes of the consecutive preforms is increased again.

It is also conceivable that the sliding planes on which the annular collars of the preform slide along run in different planes in individual areas. Because of this, tilting of the preforms occurs so that they are also deflected laterally and the spacing of their center axes is increased again.

Arrangement of the differently sloped sliding planes is also conceivable, which can also be offset at different heights. Many possibilities are conceivable here and are to be included by the present invention.

Precisely the possibility that the present invention offers by different arrangement of the sliding planes does not allow the problem of a negative arc to develop at all. The preforms can be transported in any position of their center axes so that the desired spacing of the center axes can be taken into account by changing the positions of the preforms in space.

Another idea of the present invention pertains mostly to the fact that the spacing of the sliding planes is variable relative to each other. For this purpose the sliding planes are part of the housing that preferably consists of two housing shells. The two housing shells form a slit in the area of the sliding planes, in which the edges maintain a desired spacing from each other. The edges take up the preforms between them in the use position.

In order to be able to change this spacing, the two housing shells must be movable one into the other for which purpose two arm strips of the housing shells overlap and can be joined to each other overlapping.

BRIEF DESCRIPTION OF THE DRAWINGS

Additional advantages, features and details of the invention are apparent from the following description and preferred practical examples as well as with reference to the drawing; in the drawing

FIG. 8 shows a cross section through FIG. 6 along line VIII-VIII;

FIG. 9 shows a schematic side view of parts of the device according to FIG. 7 in different arrangements of endless belts;

FIG. 10 shows a side view of a partial cutout from a device according to the invention for transport position change of objects;

FIG. 11 shows a top view of the partial cutout according to FIG. 10;

DETAILED DESCRIPTION OF THE PREFERRED EMBODIMENT

Figure 1:
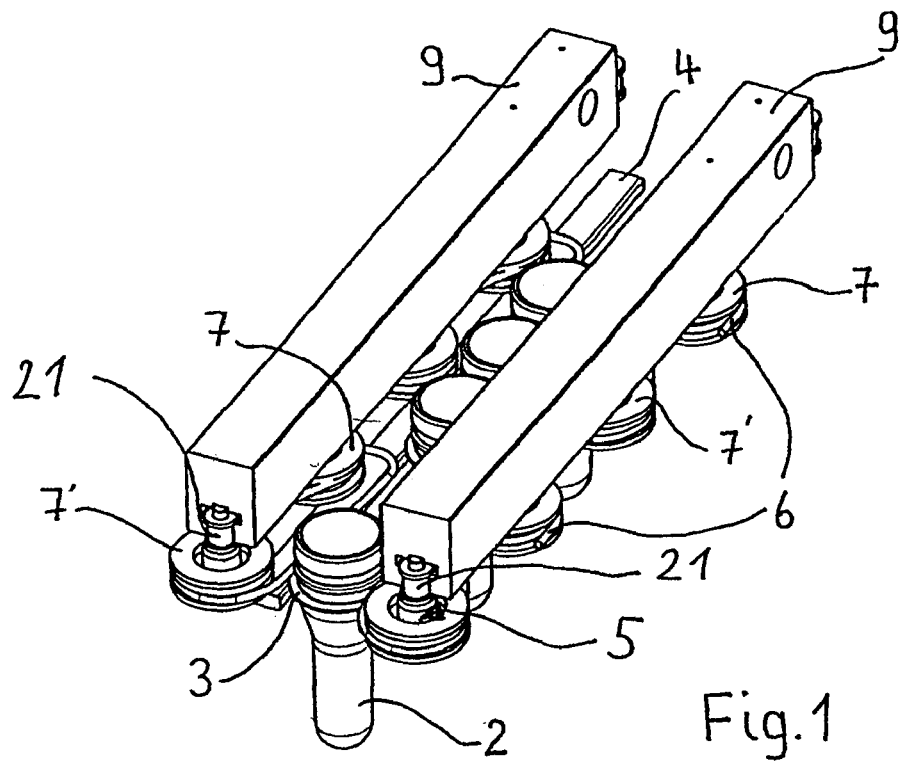
FIG. 1 shows a perspective view of a device according to the invention for transport of preforms.
Figure 12:
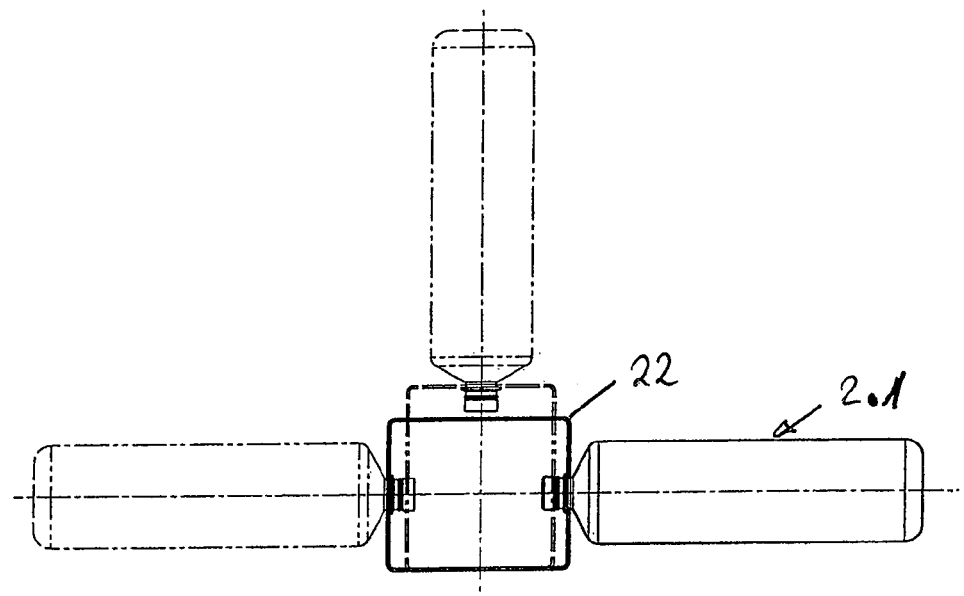
FIG. 12 shows a schematic view of different transport positions of the preforms.

FIG. 1 shows a device 1 for transport of preforms 2 for production of plastic bottles. The preforms 2 are brought for this purpose from a preform sorting not shown here in a row and introduced to device 1 and transported to a stretch blow molding machine (not shown here). The device 1 has two support devices 4, which support the preforms 2 beneath the annular collar 3. Device 1 also has transport devices 5, which support the preforms 2 or, as shown in FIG. 12, bottles 2.1 on the left and right above the annular collar 3. The transport devices 5 each consist of a chain strand 21, several mounting elements 7, 7' and several spring elements 6. The chain strand 21 is designed as a link chain similar to a bicycle chain. At some connection site of the chain links of the chain strand 21 mounting element 7, 7' are mounted on the bottom on connection pins. Two mounting element 7 and 7' are wrapped around by a spring element 6. The spring elements 6 are mounted so that an elastic effect inward in the direction of preforms 2 occurs.

Figure 2:
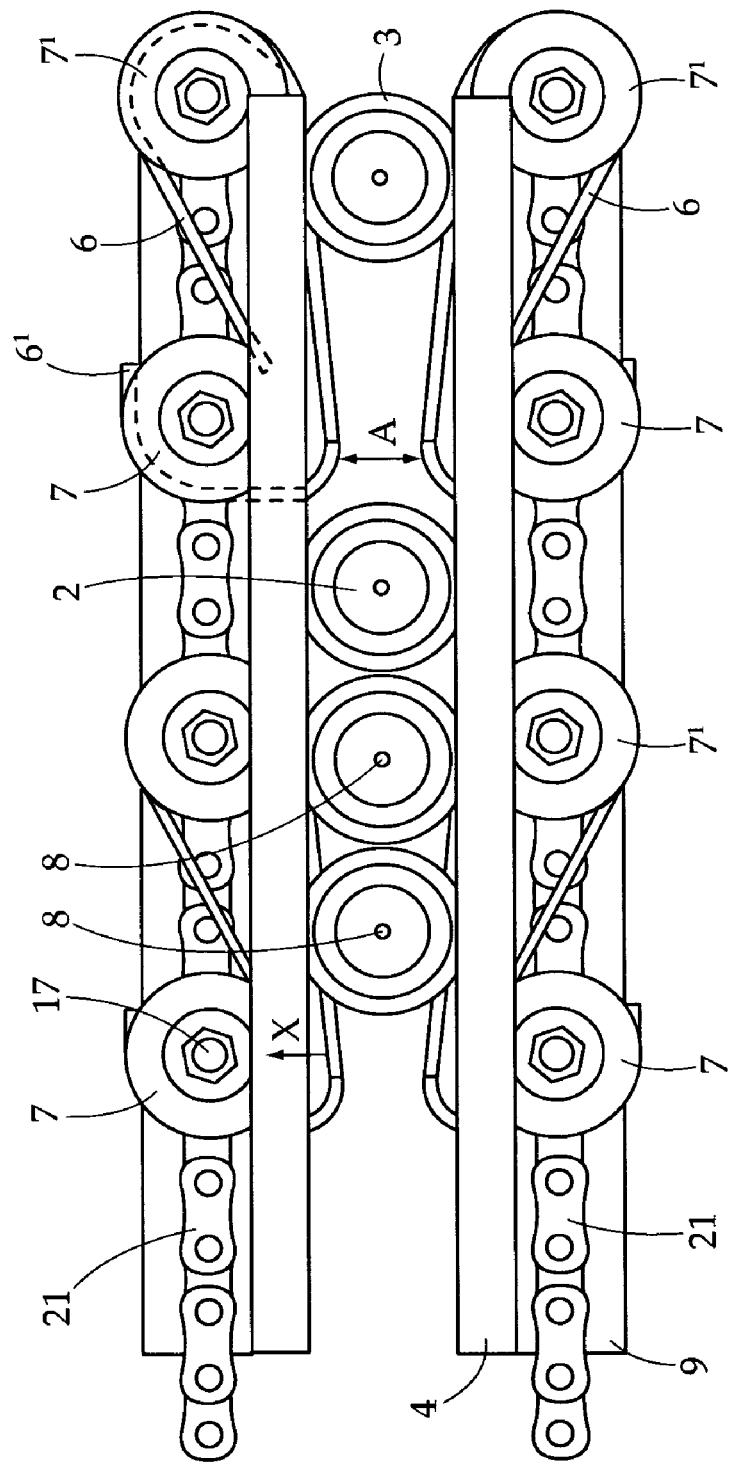
FIG. 2 shows a bottom view of such a device.

FIG. 2 shows a device 1 in a bottom view, in which it is apparent that the preforms 2 are transported in a row that is defined by lying through the center points 8 of preforms 2. Transport occurs in transport direction T. The design of the device 1 is in mirror symmetry with a plane that passes through the center point 8 and through the longitudinal axes of the preforms 2. Here again the two guides 9 can be seen in which the chain strands 21 are guided. The chains are then constructed as link chains in the form of bicycle chains. The mounting element 7 and 7' are fastened to the chain strands 21. The spring elements 6 are again mounted on them.

How a spring element 6 winds around two mounting elements 7, 7' is best shown in FIG. 2 on the right top by the dashed spring element 6. The chain beginning 6' is then bent C-shaped around the mounting element 7, the diameter of the mounting element 7 being smaller than the distance between the two arms of the C shape. This means that the lower arm of the C shape of the spring element 6 stands in the transport path of preforms 2. Spring element 6 is continued to the mounting element 7', wrapping around it one and a half times in order to then return in the direction of mounting element 7. The end of the spring element 6" is situated on the side of the mounting element 7 facing the preforms 2.

Because of installation at the beginning of the spring element 6' and the end of the spring element 6" on the mounting element 7 and by wrapping around the mounting element 7' a spring force is generated that elastically clamps the preforms 2 with a perpendicular component to the transport direction T. If no preforms 2 are situated between two opposite spring elements 6, they have a spacing A between each other, which is less than the diameter of the opening area of preform 2. If preforms 2 are situated between opposite spring 6, the C-shaped part of the element 6 moves in the direction X toward the center point 17 of mounting element 7.

Figure 3:
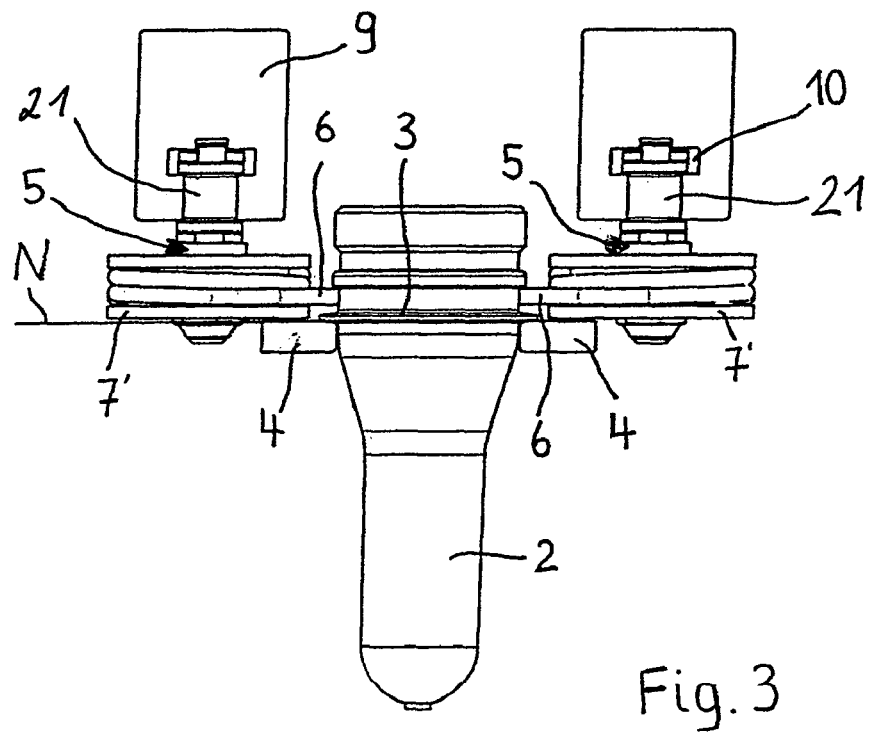
FIG. 3 shows a section through a device.

FIG. 3 shows a section for a device 1. Here again a device 2 can be seen, which is supported beneath its annular collar 3 on the left and right by a support device 4. One spring element 6 each engages above annular collar 3 to the left and right. The spring elements 6 that are in turn situated parallel to the plane of the annular collar N are fastened to mounting element 7'. Wrapping around of spring element 6 around mounting element 7' is readily apparent here. The mounting element 7' is fastened to the chain strand 21. The endlessly revolving chain strain 21 is guided in the groove 10 situated in guide 9. In this way stabilization of the transport device 5 occurs.

Figure 4:
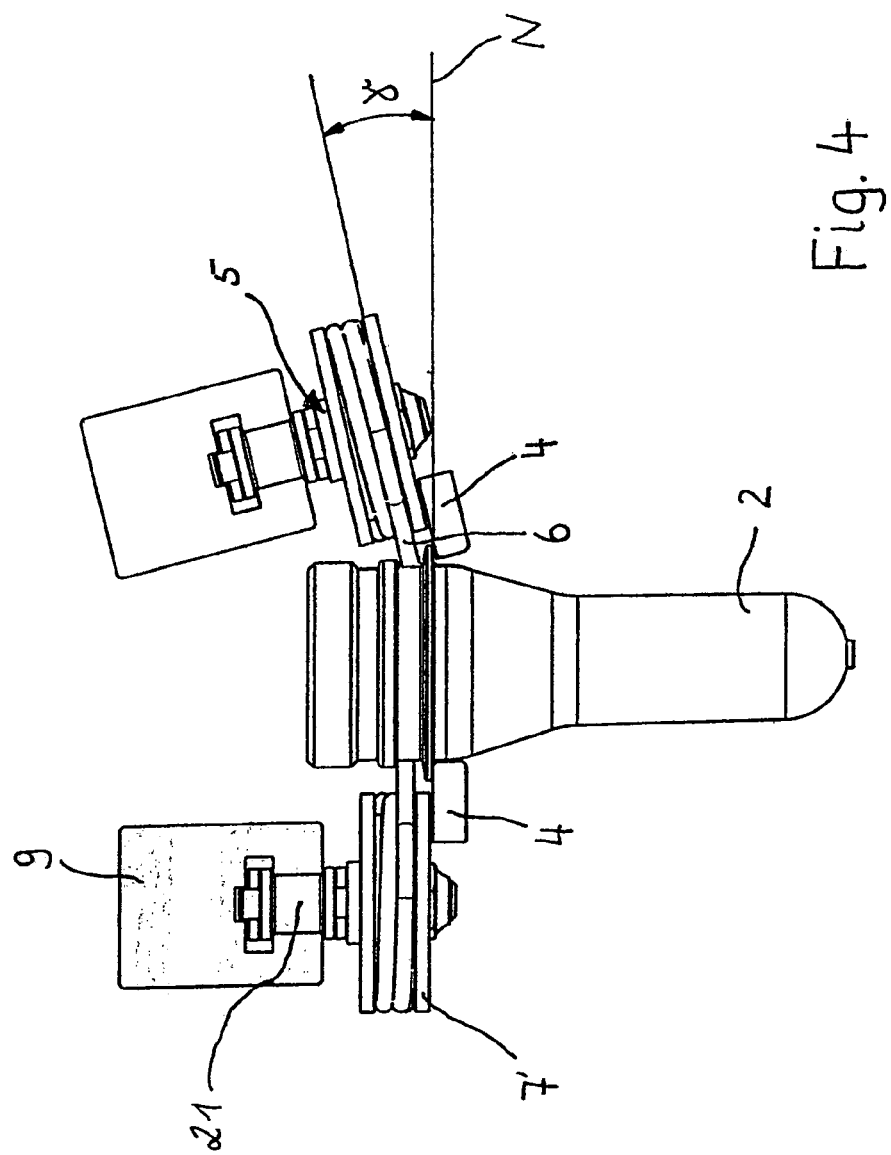
FIG. 4 shows another embodiment of a device according to FIG. 1.

In FIG. 4 the same device 1 as in FIG. 3 is shown in principle, but with the difference that a support device 4 and a transport device 5 have an angle γ to the plane of the annular collar N that is greater than zero degrees. However, the angle γ can also be present only in the transport device 5 or only in the support device 4.

Figure 5:
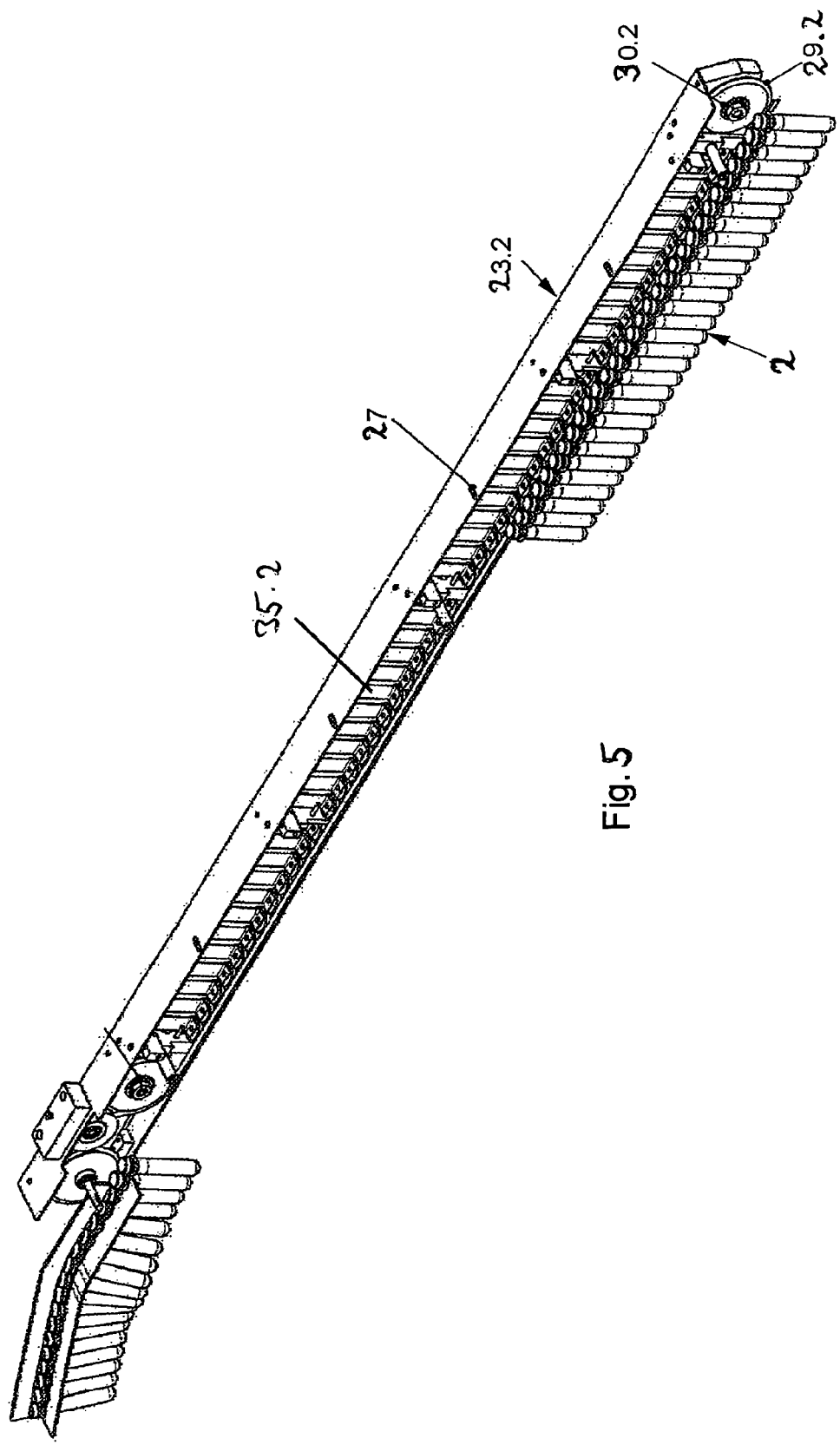
FIG. 5 shows a sectional depiction in a perspective view of another practical example of a device according to the invention for transport of preforms.
Figure 7:
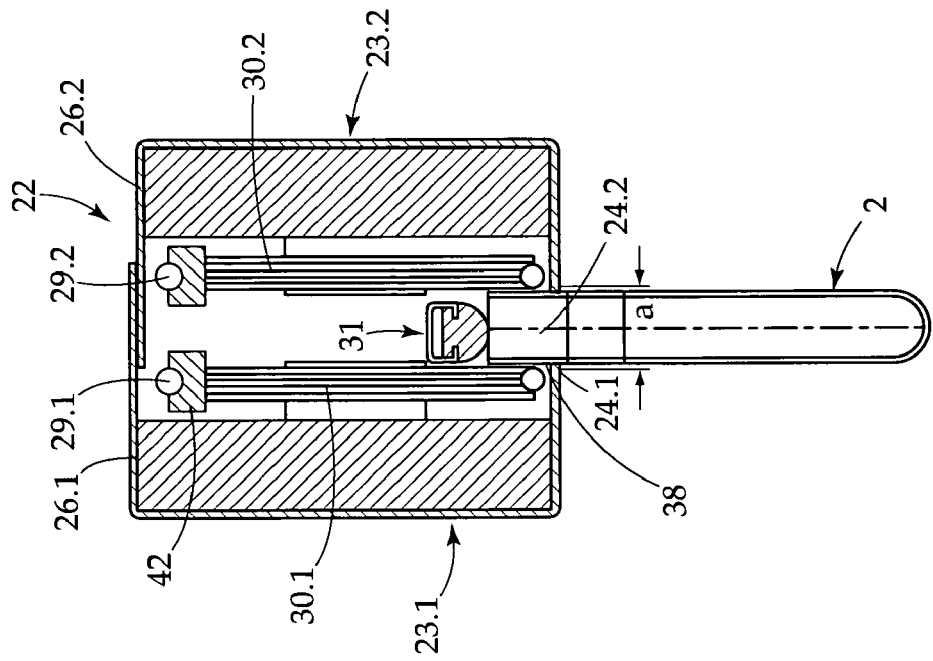
FIG. 7 shows a cross section through FIG. 6 along line VII-VII.
Figure 6:
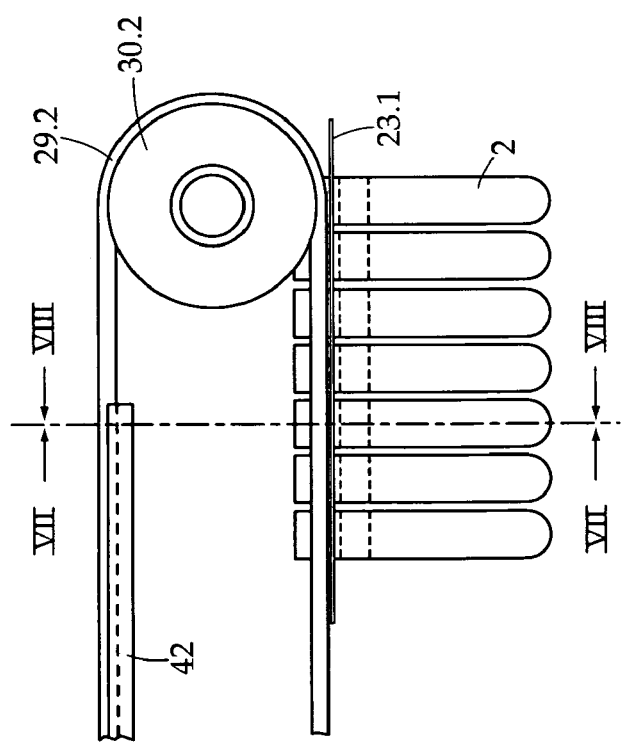
FIG. 6 shows an enlarged side view from a partial area of the device according to FIG. 5.

Another practical example of a device according to the invention for transport of preforms according to FIGS. 6 and 7 has a housing 22 formed from two housing shells 23.1 and 23.2. The housing shells 23.1 and 23.2 can be moved one into the other so that a spacing a from the edges 24.1 and 24.2, which form a slit 25 between them, can be changed. For this purpose the two housing shells 23.1 and 23.2 overlap with their upper arms 26.1 and 26.2 and are connected in this overlapping area by fastening elements (not further shown) which pass through elongated holes 27 shown in FIG. 5.

The preforms 2 slide in slit 25, in which they lie with annular collar 3 against edges 24.1 and 24.2 connected to the side to sliding planes 32.1, 32.2.

Two endless belts 29.1 and 29.2 arranged on both sides serve for transport of the preforms 2 along slit 25 in housing 22, which wrap around deflection rolls 30.1 and 30.2 and run in plastic rails 42. The endless belts 29.1 and 29.2 are nestled above annular collar 3 closely to the neck of preforms 2 and frictionally entrain the preforms 2. In order for the preforms 2 not to be able to expand upward, a rail 31 additionally serves as hold-down.

The two sliding plane 32.1 and 32.2 are indicated in FIG. 9, in which the annular collars 3 slide along. However, additional different use positions of the deflection rolls 30.1 and 30.2 are indicated by the dash-dot line so that it is apparent that the corresponding endless belts 29.1 and 29.2 engage the preform 2 in any desired position and can further transport it, depending on which position is preferred by design. This mostly depends on whether suspended transport of the preforms, horizontal or even vertical transport is desired. The last two mentioned transport possibilities are show in FIG. 12. It is also shown in FIGS. 10 and 11 that by corresponding guiding of sliding planes 32.1 and 32.2 alignment of the preforms from the horizontal position to a suspended position is possible without difficulty. The same actually applies for alignment of the preforms from a suspended to a horizontal position and from there even into a vertical position. All this is possible by the transport devices according to the invention.

According to FIGS. 7 and 8 the two endless belts 29.1 and 29.2 engage the preforms 2 from one side each so that the preforms 2 are moved through slit 25 during transport. In order for the endless belts 29.1 and 29.2 to enter into close, i.e., frictional contact with preforms 2, lateral pressure rolls 33.1 and 33.2 are provided, which force the endless belts 29.1 and 29.2 elastically against the neck of the preform 2 above the annular collar 3. These pressure rolls 33.1 and 33.2 run with the endless belts 29.1 and 29.2. They then rotate around a pivot axis 34.1 and 34.2, being each suspended on a spring tab 35.1 and 35.2, which is biased and forces the pressure rolls 33.1 and 33.2 against the endless belts 29.1 and 29.2.

Figure 13:
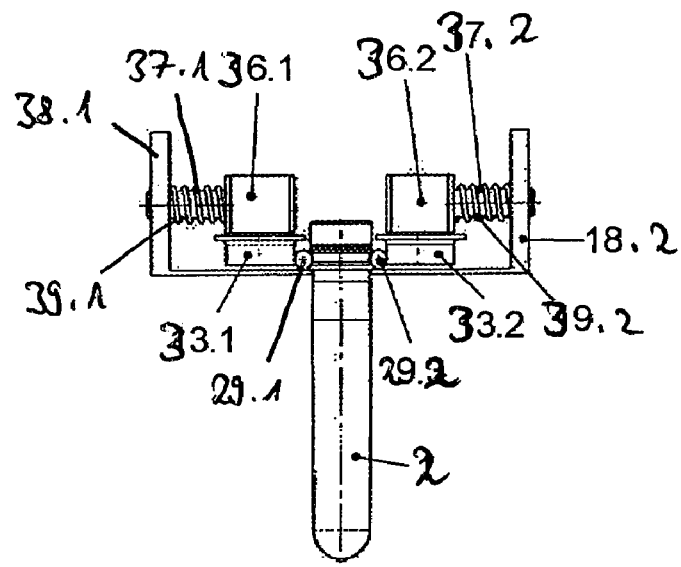
FIG. 13 shows a sectional view of parts of an additional practical example of the device for transport of free forms.
Figure 14:
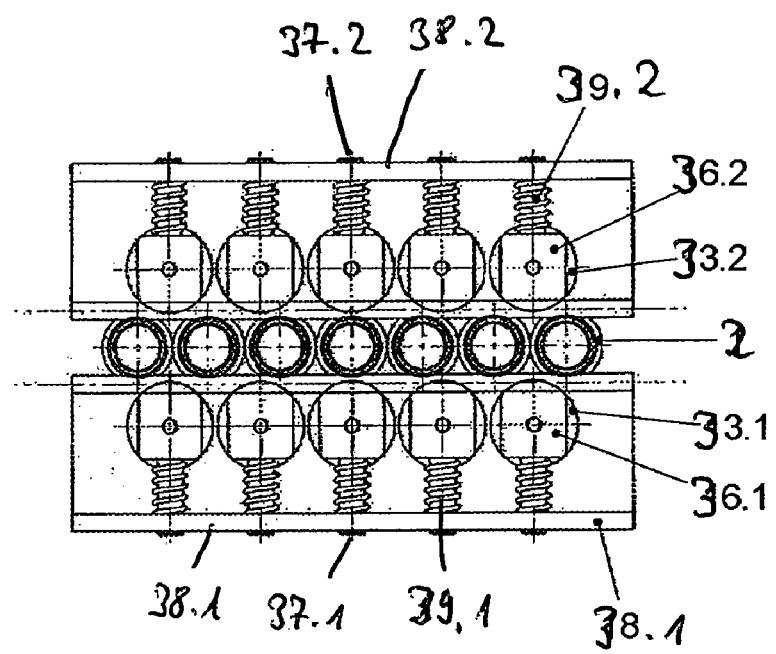
FIG. 14 shows a top view of the parts of the device according to FIG. 13.

In another variant of the device according to the invention for transport of preforms according to FIGS. 13 and 14 the pressure rolls 33.1 and 33.2 are each arranged in a support block 36.1 and 36.2, each support block 36.1 and 36.2 being held by a pin 37.1 and 37.2 against a wall 38.1 and 38.2. Each support block 36.1 and 36.2 is supported against this wall 38.1 and 38.2 by a coil spring 39, which wraps around pins 37.1 and 37.2. This coil spring 39 is also biased so that the pressure rolls 33.1 and 33.2 force the endless belts 29.1 and 29.2 against preform 2.

Figure 15:
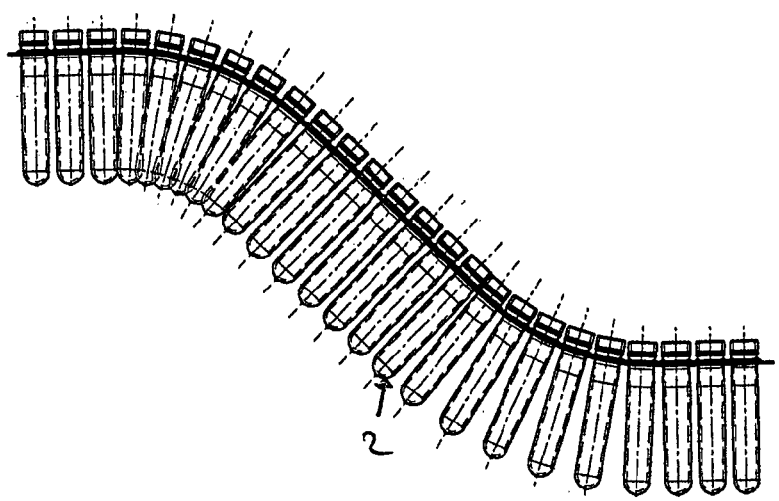
FIG. 15 shows a side view of a part of transport zone according to the prior art.
Figure 16:
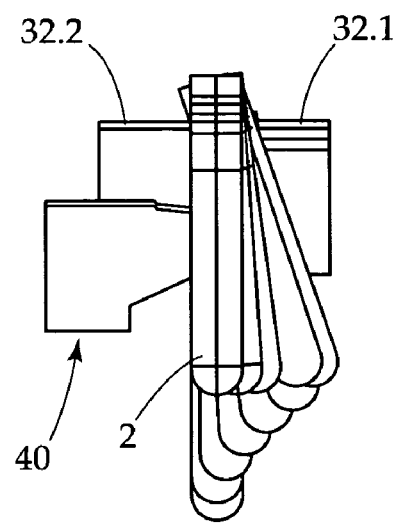
FIG. 16 shows a view of the transport device of the preforms with additional parts of the device for transport of these preforms.
Figure 17:
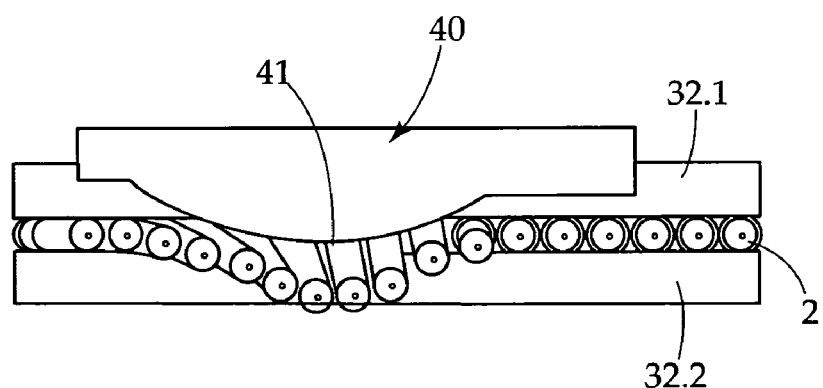
FIG. 17 shows a bottom view of partial area of the device according to FIG. 16.

According to the invention in the device for transport of preforms 2 it is also supposed to be possible for the preforms to travel along a curve transport path. For example, if the preforms are arranged suspended, as shown in FIG. 15 and pass through different slopes of the transport path, positive and negative slope areas are passed through, which means the center axes of adjacent preforms become more spaced in the positive slope areas, whereas adjacent preforms are forced against each other in the negative slope areas in the area following the annular collar 28 and mutually expand so that the preforms are no longer guided in a plane and clamped. This can be avoided according to FIGS. 16 and 17 by the fact that a deflection element 40 with a rounded sliding surface 41 is used in the area of slit 25. In the region of this sliding surface 41, the preforms 2 are deflected so that more room is available to them in the negative arc area and the drawback of negative slope is eliminated.

Figure 18:
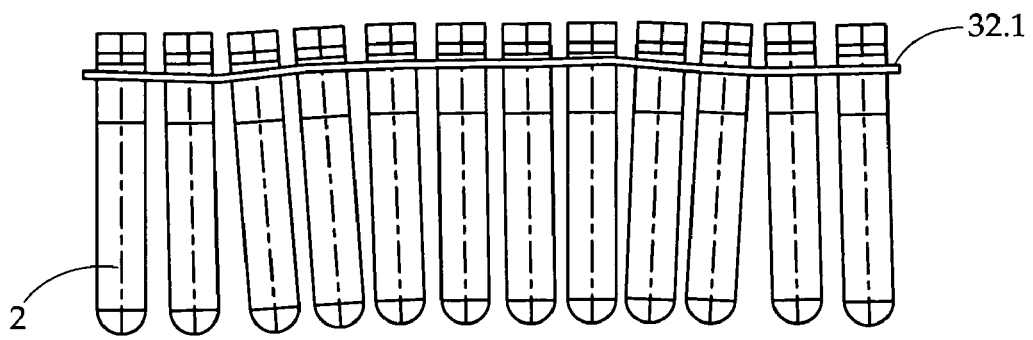
FIG. 18 shows a side view of another cutout from another practical example of a device according to the invention for transport of objects.
Figure 19:
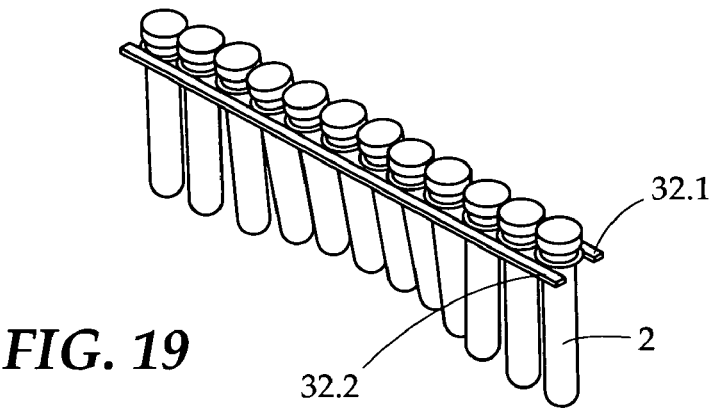
FIG. 19 shows a perspective view of the partial area according to FIG. 18.

Another possibility according to FIGS. 18 and 19 consists of the fact that the sliding planes 32.1 and 32.2 run at different heights in sections so that the preforms 2 in this area are tilted outward.

Figure 20:
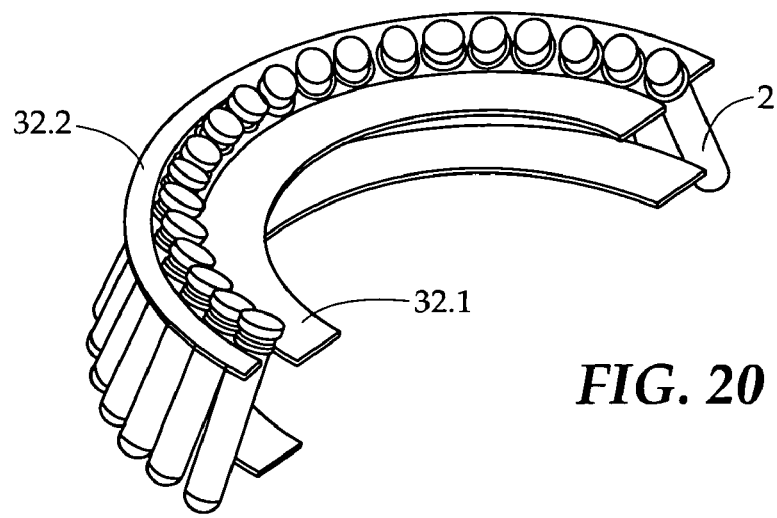
FIG. 20 shows another perspective view of another partial area of the device according to the invention for transport of objects.

There is also the possibility according to FIG. 20 to arrange sliding planes 32.1 and 32.2 sloped at different heights so that the preforms 2 are also tilted outward.

Dr. Peter Weiss, A. Brecht (M.S. in Eng.) and Petra Arat (M.S. in Forestry)

Patent Attorney

European Patent Attorney

File number: P 3454/PT Date: Sep. 1, 2006 W/ST

LIST OF REFERENCE NUMBERS

| | |
|---|---|
| 1 | Device |
| 2/2.1 | Preform/bottle |
| 3 | Annular collar |
| 4 | Support device |
| 5 | Transport devices |
| 6 | Spring element |
| 7 | Mounting element |
| 8 | Center point |
| 9 | Guides |
| 10 | Grooves |
| 11 | |
| 12 | |
| 13 | |
| 14 | |
| 15 | |
| 16 | |
| 17 | Center point of 7 |
| 18 | |
| 19 | |
| 20 | |
| 21 | Chain strand |
| 22 | Housing |
| 23 | Housing shell |
| 24 | Edge |
| 25 | Slit |
| 26 | Arm |
| 27 | Elongated hole |
| 28 | Annular collar |
| 29 | Endless belt |
| 30 | Deflection roll |
| 31 | Hold-down |
| 32 | Sliding plane |
| 33 | Pressure roll |
| 34 | Pivot axis |
| 35 | Spring tab |
| 36 | Support block |
| 37 | Pin |
| 38 | Wall |
| 39 | Coil spring |
| 40 | Deflection element |
| 41 | Sliding surface |
| 42 | Plastic rail |
| 43 | |
| 44 | |
| 45 | |
| 46 | |
| 47 | |
| 48 | |
| 49 | |
| 50 | |
| 51 | |

| | |
|---|---|
| 52 | |
| 53 | |
| 54 | |
| 55 | |
| 56 | |
| 57 | |
| 58 | |
| 59 | |
| 60 | |
| 61 | |
| 62 | |
| 63 | |
| 64 | |
| 65 | |
| 66 | |
| 67 | |
| 68 | |
| 69 | |
| 70 | |
| 71 | |
| 72 | |
| 73 | |
| 74 | |
| 75 | |
| 76 | |
| 77 | |
| 78 | |
| 79 | |
| A | Spacing |
| a | Spacing |
| N | Annular collar plane |
| T | Transport direction |
| X | Direction |
| γ | Angle |

The invention claimed is:

1. A device for the transport of objects comprising:
   a pair of guides, wherein the guides are oriented in a parallel direction and wherein each guide further comprises:
      a groove, wherein the groove extends along the length of the guide;
      a chain strand, wherein the chain strand is located within the groove;
   a plurality of transport devices, wherein each transport device interacts with the chain strand contained within the groove, and wherein each transport device further comprises:
      a plurality of mounting elements, wherein each mounting element is fastened to the transport device;
      a plurality of spring elements, wherein the spring elements interact with the plurality of mounting elements; and
   wherein the plurality of mounting elements are rolls.

2. The device of claim 1 further comprising a pair of support devices, wherein each support device extends below a corresponding guide and is attached to the mounting elements contained within the guide.

3. The device of claim 1, wherein each spring element is wrapped around a pair of mounting elements such that a spring force is generated to engage an object for transport.

4. The device of claim 1, wherein each spring element consists of a bent wire.

5. The device of claim 1, wherein each chain strand is composed of a plurality of interconnected link chains.

6. The device of claim 2, wherein an object for transport having an annular collar is grasped by the support devices below the collar and by the transport devices above the collar.

7. The device of claim 1, wherein the rolls are equidistantly disposed along the transport devices contained within the chain strand.

8. A device for the transport of objects comprising:
   a housing, wherein the housing consists of a pair of housing shells each containing an upper arm thereby creating an overlap between the shells;
      wherein the pair of housing shells is disposed to be moved one into the other;
   a slit, wherein the slit is located within the bottom of the housing to allow for attachment of an object for transport;
   a pair of plastic rails, wherein the plastic rails are situated within the housing;
   a pair of deflection rolls, wherein each deflection roll operates within a corresponding plastic rail; and
   a pair of belts, wherein each belt encompasses a corresponding deflection roll within each rail.

9. The device of claim 8 further comprising a rail, wherein the rail prevents an object from extending upwardly into the housing.

10. The device of claim 8 further comprising a pair of sliding planes, wherein each sliding plane is located next to the slit contained within the bottom of the housing.

11. The device of claim 10, further comprising a pair of pressure rolls, wherein each pressure roll is situated against each corresponding sliding plane.

12. The device of claim 11 wherein each pressure rolls extends along each corresponding belt and rotates around a corresponding pivot axis.

13. The device of claim 12, wherein each pivot axis is suspended on a spring tab disposed to force the pressure rolls against the belts.

14. The device of claim 11, wherein each pressure roll is arranged in a support block, wherein each support block is held in place by a pin.

15. The device of claim 14, wherein each support block is supported against the wall of the housing by a coil spring and wherein each coil wraps around each pin.

16. The device of claim of 15, wherein each coil spring is disposed to force the pressure rolls and the belts against an object for transport.

17. The device of claim 8 further comprising a deflection element, wherein the deflection element is located within the slit of the housing.

18. The device of claim of 8, wherein the deflection rolls are disposed to tilt.

* * * * *